(12) United States Patent
Mochizuki (10) Patent No.: US 11,380,000 B2
(45) Date of Patent: Jul. 5, 2022

(54) OPERATION DETECTION DEVICE AND OPERATION DETECTION METHOD

(71) Applicant: MURAKAMI CORPORATION, Shizuoka (JP)

(72) Inventor: Takayoshi Mochizuki, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 46 days.

(21) Appl. No.: 16/969,061

(22) PCT Filed: Feb. 5, 2019

(86) PCT No.: PCT/JP2019/004054
§ 371 (c)(1),
(2) Date: Aug. 11, 2020

(87) PCT Pub. No.: WO2019/159759
PCT Pub. Date: Aug. 22, 2019

(65) Prior Publication Data
US 2021/0035311 A1 Feb. 4, 2021

(30) Foreign Application Priority Data

Feb. 19, 2018 (JP) .............................. JP2018-026996

(51) Int. Cl.
*G06T 7/254* (2017.01)
*G06T 7/194* (2017.01)
*G06T 7/11* (2017.01)

(52) U.S. Cl.
CPC ............... *G06T 7/254* (2017.01); *G06T 7/11* (2017.01); *G06T 7/194* (2017.01); *G06T 2207/10016* (2013.01)

(58) Field of Classification Search
CPC . G06T 2207/10016; G06T 7/11; G06T 7/194; G06T 7/254
See application file for complete search history.

(56) References Cited

U.S. PATENT DOCUMENTS 7,038,577 B2 * 5/2006 Pawlicki ............... B60W 30/18
340/436
10,437,347 B2 * 10/2019 Holz .................. G02B 27/0093
(Continued)

FOREIGN PATENT DOCUMENTS

JP 2012-003585 A 1/2012
JP 2013-218395 A 10/2013
(Continued)

OTHER PUBLICATIONS

Apr. 9, 2019 International Search Report in PCT Application No. PCT/JP2019/004054.
(Continued)

*Primary Examiner* — Mia M Thomas
(74) *Attorney, Agent, or Firm* — Greenblum & Bernstein, P.L.C.

(57) ABSTRACT

An operation detection device according to an embodiment is an operation detection device that detects an object approaching an operation unit. The operation detection device includes: a sensor that detects a distance from the object as a plurality of pixels; and an object detection unit that detects the object. The object detection unit specifies a first pixel corresponding to the distance that is the shortest among the plurality of pixels, scans a plurality of second pixels located around the first pixel, and detects the object when the number of second pixels for which a difference between a distance corresponding to each of the second pixels and the shortest distance is equal to or less than a predetermined value, among the plurality of second pixels, is equal to or greater than a predetermined number.

19 Claims, 8 Drawing Sheets

(56) References Cited

U.S. PATENT DOCUMENTS

| | | | | |
|---|---|---|---|---|
| 2010/0265600 | A1* | 10/2010 | Okuda | B60R 1/025 |
| | | | | 359/843 |
| 2010/0315215 | A1* | 12/2010 | Yuda | G08G 1/167 |
| | | | | 340/435 |
| 2013/0265219 | A1 | 10/2013 | Sato | |
| 2014/0334683 | A1* | 11/2014 | Masuda | G06T 7/254 |
| | | | | 382/103 |
| 2016/0090043 | A1* | 3/2016 | Kim | B60R 1/081 |
| | | | | 701/49 |
| 2016/0274691 | A1 | 9/2016 | Murase et al. | |
| 2018/0260650 | A1* | 9/2018 | Kawaguchi | G06K 9/3241 |
| 2019/0056791 | A1* | 2/2019 | Holz | G02B 27/0172 |
| 2021/0293963 | A1* | 9/2021 | Nehmadi | G01S 17/86 |

FOREIGN PATENT DOCUMENTS

| | | |
|---|---|---|
| JP | 2014-181949 A | 9/2014 |
| JP | 2016-177491 A | 10/2016 |

OTHER PUBLICATIONS

Sep. 3, 2020 International Preliminary Report on Patentability and Written Opinion of International Searching Authority in PCT/JP2019/004054.

\* cited by examiner

OPERATION DETECTION DEVICE AND OPERATION DETECTION METHOD

TECHNICAL FIELD

The present disclosure relates to an operation detection device and an operation detection method.

BACKGROUND ART

Patent Literature 1 discloses a user interface device using a distance image sensor. The user interface device includes a transparent display that displays an image, a distance image sensor that acquires a distance image for measuring a distance from an object, and a distance image analysis unit that analyzes the distance image to detect a user's input operation. In the user interface device, the distance image sensor recognizes the center of gravity of an object at a close distance to some extent as a point position, and the distance image analysis unit detects the user's input operation based on the recognized point position.

CITATION LIST

Patent Literature

Patent Literature 1: Japanese Unexamined Patent Publication 2012-3585

SUMMARY OF INVENTION

Technical Problem

Incidentally, in the operation detection device that detects an object by acquiring the distance image as described above, the sensor detects the distance from the object as a plurality of pixels. Each pixel acquired by the sensor is associated with the distance between each point on the surface of the object and the sensor. The operation detection device detects an object by specifying any one of the plurality of pixels acquired by the sensor as a pixel indicating that the distance from the object is short.

However, this type of operation detection device may erroneously detect a pixel indicating that the distance from the object is short, even though no object is present, and this pixel may become noise. That is, since the pixel detected by the sensor includes noise, there is a possibility that an object will be erroneously detected even though no object is present. Therefore, there is room for improvement in the accuracy of detecting the object. In addition, when calculating the center of gravity of an object as in the user interface device described above, it is considered that the acquisition of the shape of the object is necessary. In this case, since the load of calculation processing and the like increases, a problem that it takes time to detect the object may occur.

It is an object of the present disclosure to provide an operation detection device and an operation detection method capable of detecting an object with high accuracy and at high speed.

Solution to Problem

An operation detection device according to an embodiment is an operation detection device that detects an object approaching an operation unit. The operation detection device includes: a sensor that detects a distance from the object as a plurality of pixels; and an object detection unit that detects the object. The object detection unit specifies a first pixel corresponding to the distance that is the shortest among the plurality of pixels, scans a plurality of second pixels located around the first pixel, and detects the object when the number of second pixels for which a difference between a distance corresponding to each of the second pixels and the shortest distance is equal to or less than a predetermined value, among the plurality of second pixels, is equal to or greater than a predetermined number.

An operation detection method according to an embodiment is an operation detection method for detecting an object approaching an operation unit using a sensor. The operation detection method includes: a step of detecting a distance from the object to the sensor as a plurality of pixels; a step of specifying a first pixel corresponding to the distance that is the shortest among the plurality of pixels; and a step of scanning a plurality of second pixels located around the first pixel and detecting the object when the number of second pixels for which a difference between a distance corresponding to each of the second pixels and the shortest distance is equal to or less than a predetermined value, among the plurality of second pixels, is equal to or greater than a predetermined number.

In the operation detection device and the operation detection method described above, the sensor detects the distance from the object as a plurality of pixels, and the object detection unit specifies the first pixel corresponding to the shortest distance from the object. The object detection unit scans the plurality of second pixels located around the specified first pixel, and detects the object when the number of second pixels corresponding to a distance whose difference from the shortest distance is equal to or less than a predetermined value, among the plurality of scanned second pixels, is equal to or greater than a predetermined number. On the other hand, when the number of second pixels corresponding to the distance whose difference from the shortest distance is equal to or less than the predetermined value, among the plurality of scanned second pixels, is less than the predetermined number, the object detection unit does not detect the object. In this manner, by not detecting the object when the number of second pixels is less than the predetermined number, it can be determined that the specified first pixel is noise. As a result, since the influence of noise can be eliminated and erroneous detection of the object can be suppressed, the object can be detected with high accuracy. In addition, in the operation detection device and the operation detection method, since the process of acquiring the shape of the object when detecting the object is unnecessary, it is possible to reduce the processing load to increase the processing speed. Therefore, the object can be detected at high speed.

The operation detection device described above may further include a determination unit that determines whether or not an operation on the operation unit by the object detected by the object detection unit has been performed. Since the operation detection device described above includes the determination unit, it can be determined whether or not an operation on the operation unit has been performed.

The operation unit may be displayed as a virtual image. When the operation unit is displayed as a virtual image, the operation unit can be displayed as if the operation unit floats, so that the visibility of the operation unit can be improved. When the operation unit is displayed as a virtual image, there may be a change in the position of the operation unit recognized by the user. Accordingly, it is assumed that the pressing operation on the operation unit is not appropriately performed. Even in such a case, in the operation detection device and the operation detection method, it is possible to suppress erroneous detection of the object. Therefore, according to the operation detection device and the operation detection method, the object can be detected with high accuracy.

Advantageous Effects of Invention

According to the present disclosure, it is possible to detect an object with high accuracy and at high speed.

DESCRIPTION OF EMBODIMENTS

Hereinafter, embodiments of an operation detection device and an operation detection method according to the present disclosure will be described in detail with reference to the accompanying diagrams. In the description of the diagrams, the same elements are denoted by the same reference numerals, and the repeated description thereof will be appropriately omitted.

Figure 1:
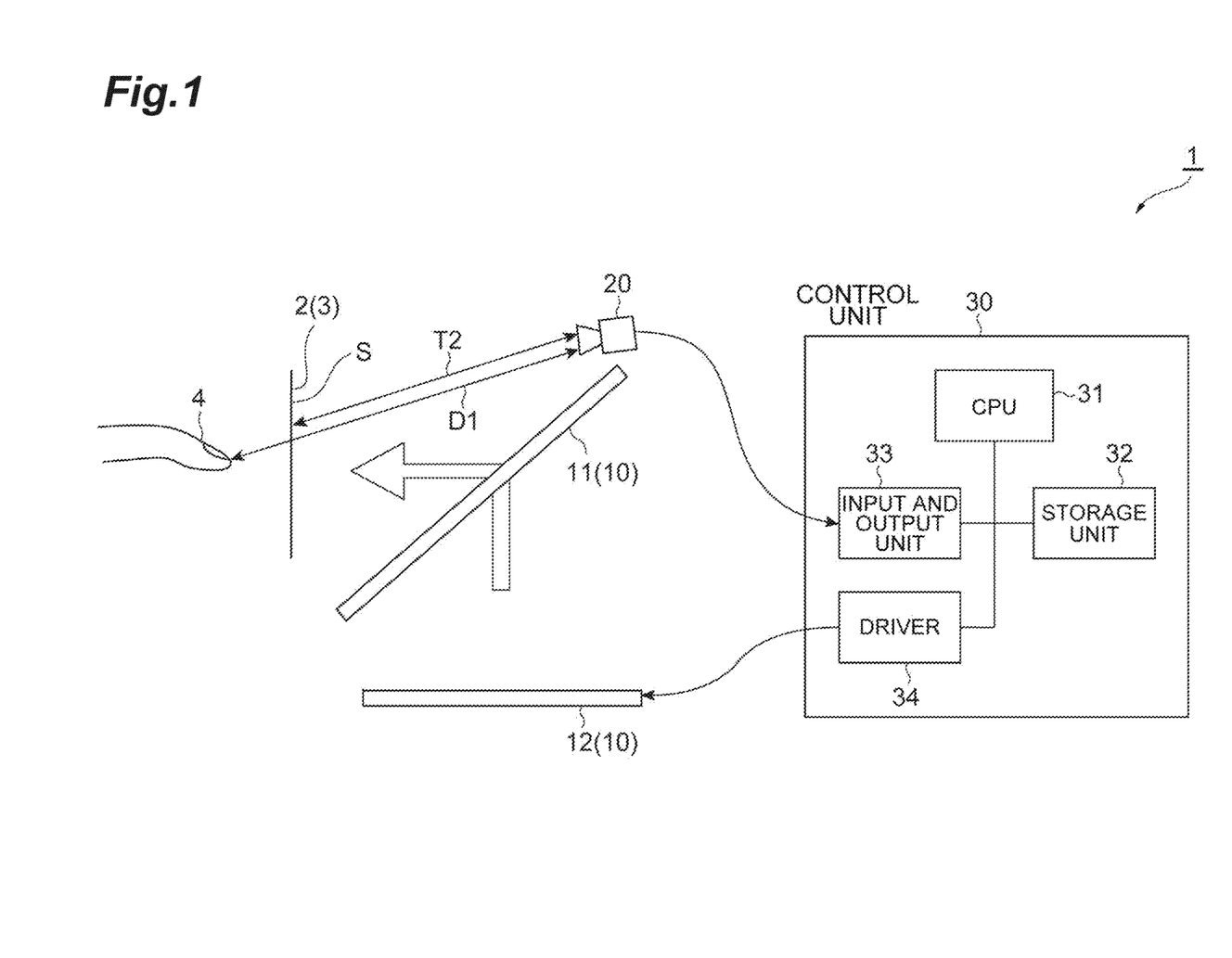
FIG. 1 is a configuration diagram illustrating an operation detection device according to an embodiment.

FIG. 1 is a configuration diagram illustrating an operation detection device 1 of the present embodiment. The operation detection device 1 is, for example, an operation detection device that constructs an HMI (Human Machine Interface) between a vehicle and a passenger (user) of the vehicle. The operation detection device 1 displays an operation unit 2 in the air as a virtual image 3 on the front side when viewed from the user, and detects an object 4 approaching the operation unit 2. The operation unit 2 is, for example, a portion capable of operating each device mounted in the vehicle (for example, a vehicle-mounted back camera, an air conditioner, or the like), and is, for example, a button such as a switch displayed as the virtual image 3. The object 4 is for operating the operation unit 2 to operate the device, and is, for example, a user's finger or a rod-shaped object such as a pen.

The operation detection device 1 detects an operation on the operation unit 2 by the object 4 based on the detected position of the object 4, and operates each device based on the detected operation. Examples of the operation include a pressing operation, a tap operation, a sliding operation, and the like of the operation unit 2 by the object 4, but the type of the operation is not particularly limited. In the present embodiment, a pressing operation is exemplified as an operation on the operation unit 2. The pressing operation includes both an operation of pushing down the operation unit 2 and an operation of pushing up the operation unit 2.

As illustrated in FIG. 1, the operation detection device 1 includes a display unit 10, a depth sensor 20 (sensor), and a control unit 30. The display unit 10 displays the operation unit 2 as the virtual image 3 in the air. The display unit 10 includes an AI (Aerial Imaging) plate 11 (registered trademark), which is an aerial image forming element, and a liquid crystal panel 12. The AI plate 11 is manufactured, for example, using a technique described in Japanese Patent No. 4865088.

The liquid crystal panel 12 is a display of a PC (personal computer), a tablet terminal, or a mobile terminal such as a mobile phone, for example. The liquid crystal panel 12 is arranged, for example, so that its display surface is approximately horizontal. The AI plate 11 is inclined with respect to the liquid crystal panel 12 (horizontal direction). The inclination angle of the AI plate 11 with respect to the liquid crystal panel 12 may be variable. The liquid crystal panel 12 displays an image based on the signal output from the control unit 30.

Figure 2:
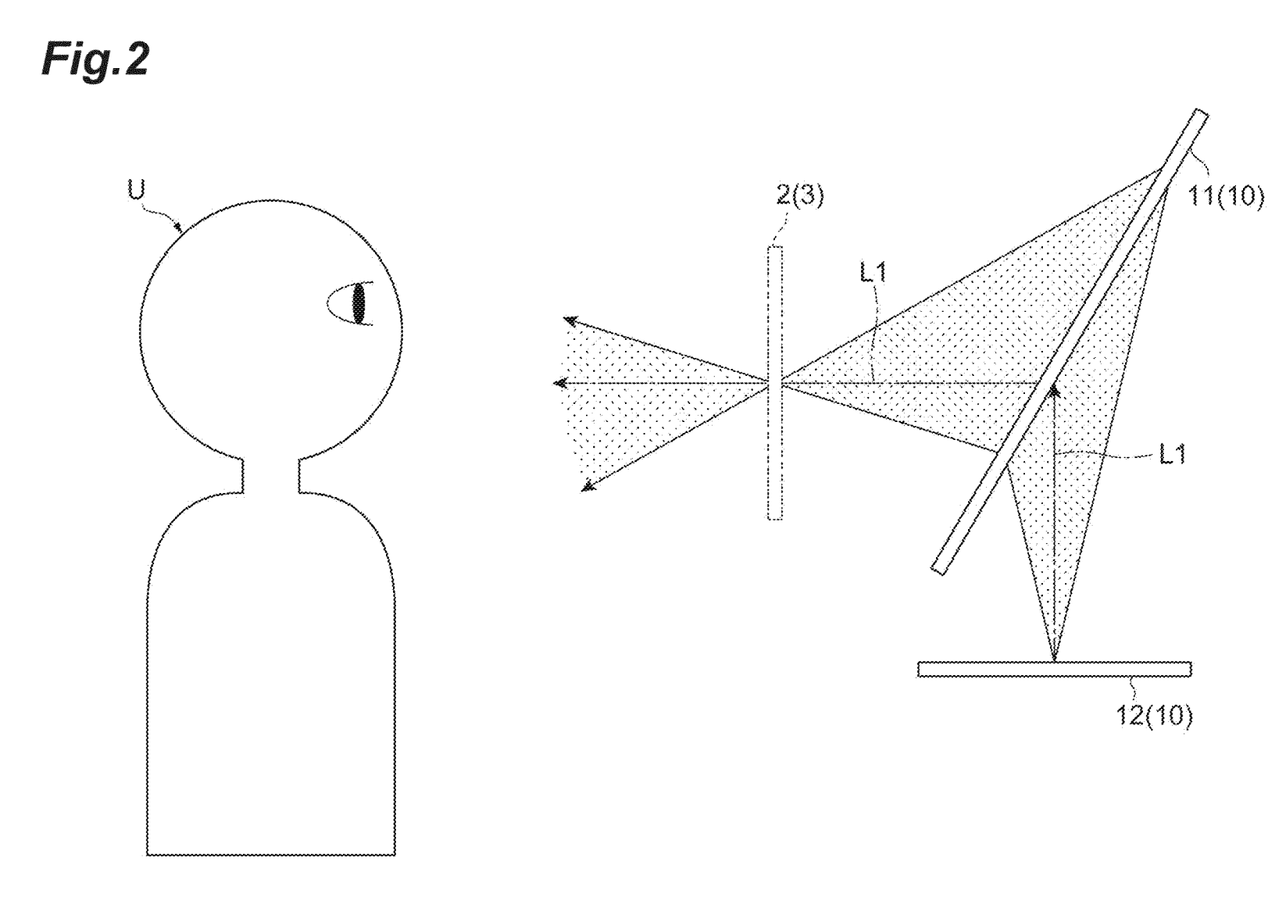
FIG. 2 is a conceptual diagram illustrating a virtual image displayed by a display unit of the operation detection device illustrated in FIG. 1.

FIG. 2 is a conceptual diagram illustrating the virtual image 3 displayed by the display unit 10. As illustrated in FIG. 2, the image displayed on the liquid crystal panel 12 is displayed by the AI plate 11 as the virtual image 3 at a position on a user U side with respect to the AI plate 11 and the liquid crystal panel 12. For example, light L1 emitted upward from the liquid crystal panel 12 and incident on the AI plate 11 is reflected twice by the AI plate 11, and the virtual image 3 is formed in a space on the front side of the display unit 10 when viewed from the user U.

Figure 3:
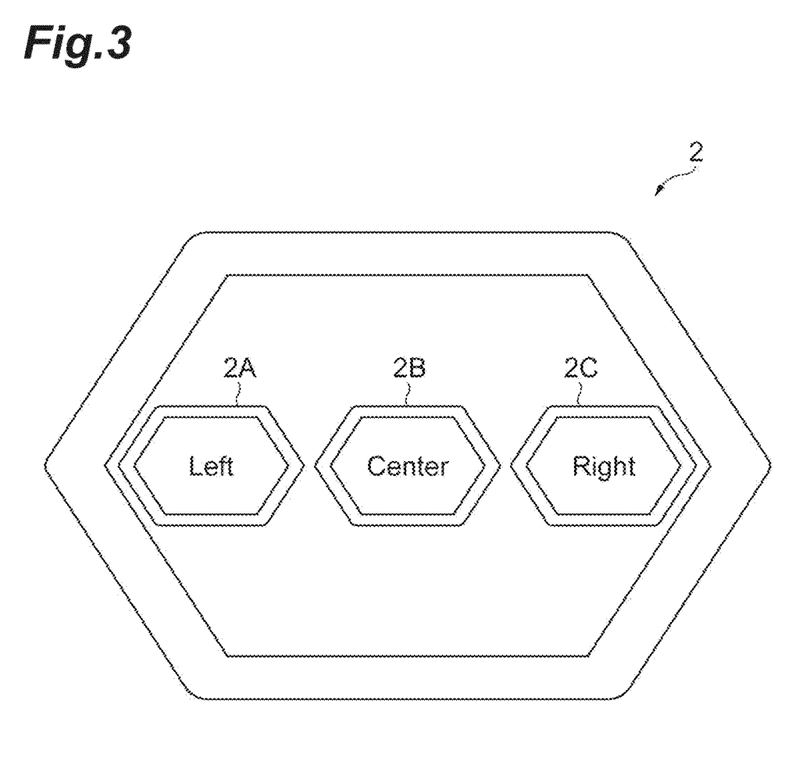
FIG. 3 is a diagram illustrating an example of an operation unit displayed as a virtual image.

FIG. 3 is an example of the operation unit 2 displayed as the virtual image 3. As illustrated in FIG. 3, the operation unit 2 is, for example, an operation screen on which a vehicle-mounted back camera can be operated, and can switch the imaging position of the vehicle-mounted back camera by pressing each button of the operation unit 2. As an example, the operation unit 2 includes a first virtual image button 2A for imaging the left side of the vehicle, a second virtual image button 2B for imaging the rear side of the vehicle, and a third virtual image button 2C for imaging the right side of the vehicle.

FIG. 1 is referred to again. The depth sensor 20 is provided on a side opposite to the object 4 with the operation unit 2 interposed therebetween. In one example, the depth sensor 20 is provided on a virtual straight line that connects the operation unit 2 and the object 4 to each other. The depth sensor 20 acquires distance image data including information of the position (two-dimensional position) of the object 4 on a plane perpendicular to the virtual straight line and information of a distance D1 from the depth sensor 20 to the object 4. The distance image data is acquired as, for example, 640×480 pixels. The depth sensor 20 outputs the acquired distance image data to the control unit 30 at predetermined periods (for example, 1/30 second).

Specifically, the depth sensor 20 emits a light beam (for example, an infrared ray) to each point on an object present in the imaging region including the object 4, and receives the light beam reflected from each point on the object. Then, the depth sensor 20 measures a distance between the depth sensor 20 and each point on the object based on the received light beam, and outputs the measured distance for each pixel.

The distance between the depth sensor 20 and each point on the object is measured by, for example, a Light Coding method. In this method, the depth sensor 20 emits a light beam to each point on the object, which is present in the imaging region including the object 4, in a random dot pattern. Then, the depth sensor 20 receives the light beam reflected from each point on the object and detects the distortion of the pattern of the reflected light beam to measure the distance between the depth sensor 20 and each point on the object. The depth sensor 20 detects the information of the two-dimensional position of each point on the object and the information of the distance from the depth sensor 20 to each point on the object as a plurality of pixels, and outputs the plurality of detected pixels to the control unit 30.

The control unit 30 can communicate with the depth sensor 20 and the liquid crystal panel 12. The control unit 30 includes, for example, a CPU 31 (Central Processing Unit) that executes a program, a storage unit 32 such as a ROM (Read Only Memory) and a RAM (Random Access Memory), an input and output unit 33, and a driver 34. The function performed by each functional component of the control unit 30 is realized by operating the input and output unit 33 and reading and writing data in the storage unit 32 under the control of the CPU 31. The form and location of the control unit 30 are not particularly limited.

Figure 4:
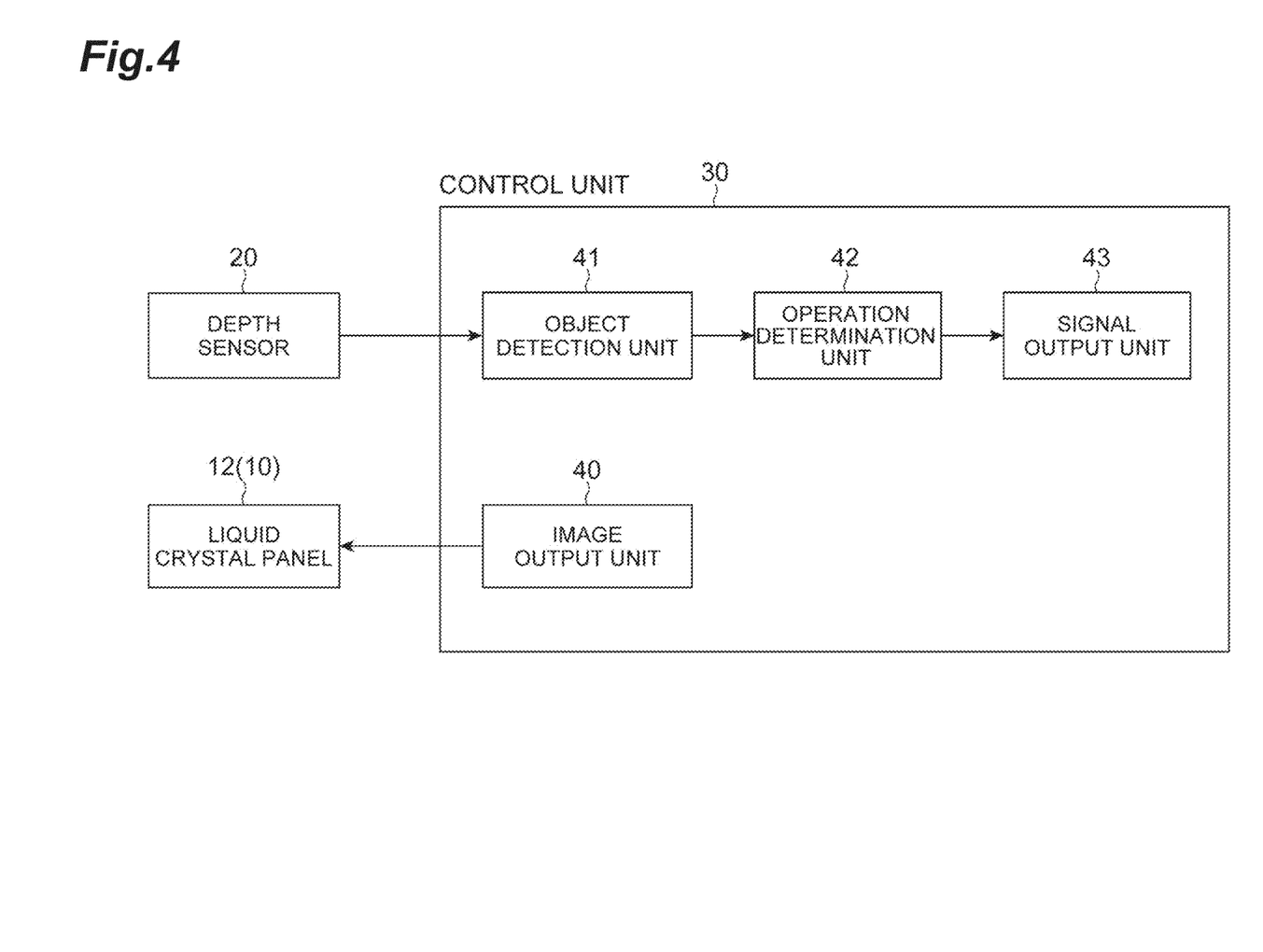
FIG. 4 is a functional block diagram of a control unit of the operation detection device illustrated in FIG. 1.

FIG. 4 is a functional block diagram of the control unit 30. As illustrated in FIG. 4, the control unit 30 has an image output unit 40, an object detection unit 41, an operation determination unit 42, and a signal output unit 43 as functional components. The image output unit 40 outputs image data of an image displayed on the liquid crystal panel 12 to the liquid crystal panel 12. The image displayed on the liquid crystal panel 12 is not limited to the operation screen illustrated in FIG. 3. The liquid crystal panel 12 can display various kinds of images based on the image data from the image output unit 40.

Figure 5:
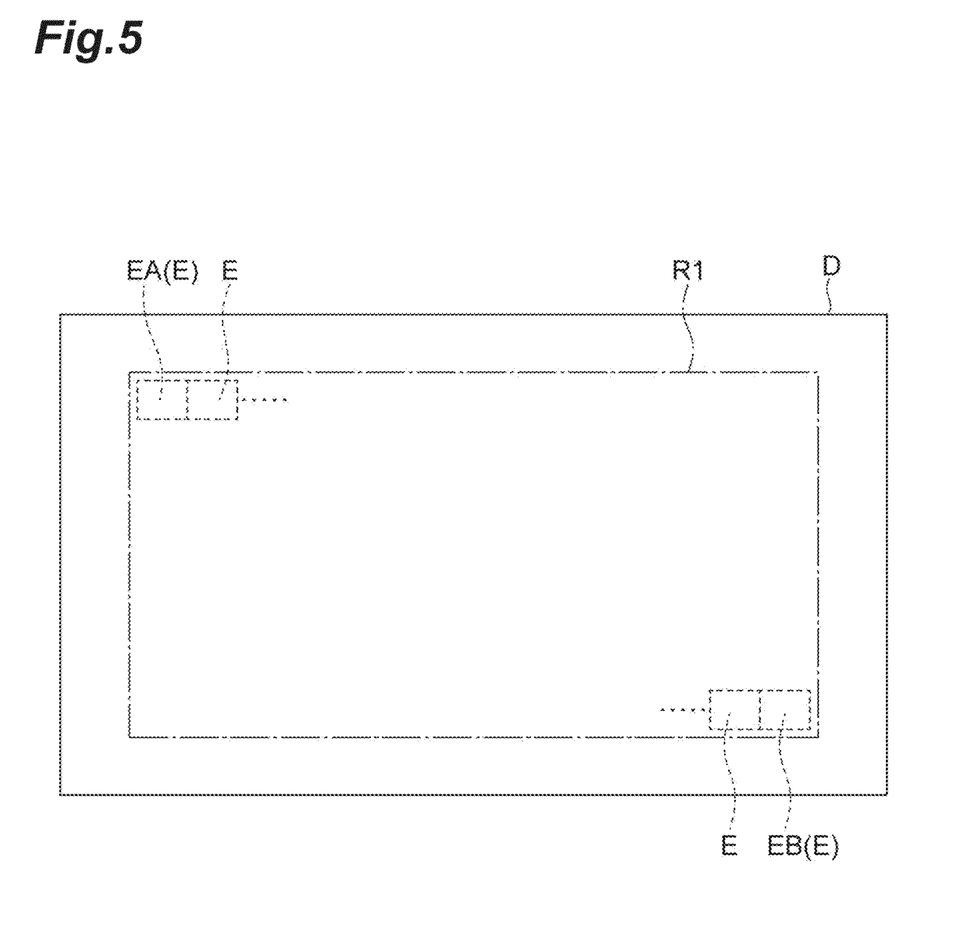
FIG. 5 is a diagram illustrating an example of distance image data output by a sensor of the operation detection device illustrated in FIG. 1.

The object detection unit 41 detects the object 4 by specifying a pixel indicating that the distance between the depth sensor 20 and the object 4 is short, among a plurality of pixels included in distance image data output from the depth sensor 20. FIG. 5 is a diagram schematically illustrating distance image data D output from the depth sensor 20. When the distance image data D is input from the depth sensor 20, the object detection unit 41 sets a scanning region R1 for the distance image data D.

The scanning region R1 is, for example, a region to be scanned in the distance image data D. The object detection unit 41 sets, for example, a region including the center of the distance image data D as the scanning region R1. As described above, the object detection unit 41 sets the region including the center of the distance image data D (that is, a region excluding an end portion of the distance image data D) as the scanning region R1, so that the speed of detecting the object 4 can be increased. The object detection unit 41 may set the entire distance image data D as the scanning region R1. The object detection unit 41 sets a temporary reference value T1 as a value indicating the shortest distance among the distances between the depth sensor 20 and respective points on the object 4. The temporary reference value T1 is, for example, 300 mm, but can be appropriately changed.

For example, the object detection unit 41 sets the position of a pixel EA at one corner on the diagonal of the rectangular scanning region R1, among a plurality of pixels E in the scanning region R1, as a scanning start position and sets the position of a pixel EB at the other corner as a scanning end position, and sequentially scans the pixel EA to the pixel EB for each pixel E in the scanning region R1. Information of the distance between the depth sensor 20 and each point on the object is associated with each pixel E. The object detection unit 41 determines, for each pixel E, whether or not the distance corresponding to the pixel E is smaller than the temporary reference value T1. When it is determined that the distance is smaller than the temporary reference value T1, the object detection unit 41 specifies the pixel E corresponding to the distance as a first pixel. The first pixel is the pixel E corresponding to the shortest distance between the depth sensor 20 and each point on the object 4 among the plurality of pixels E in the scanning region R1.

Figure 6:
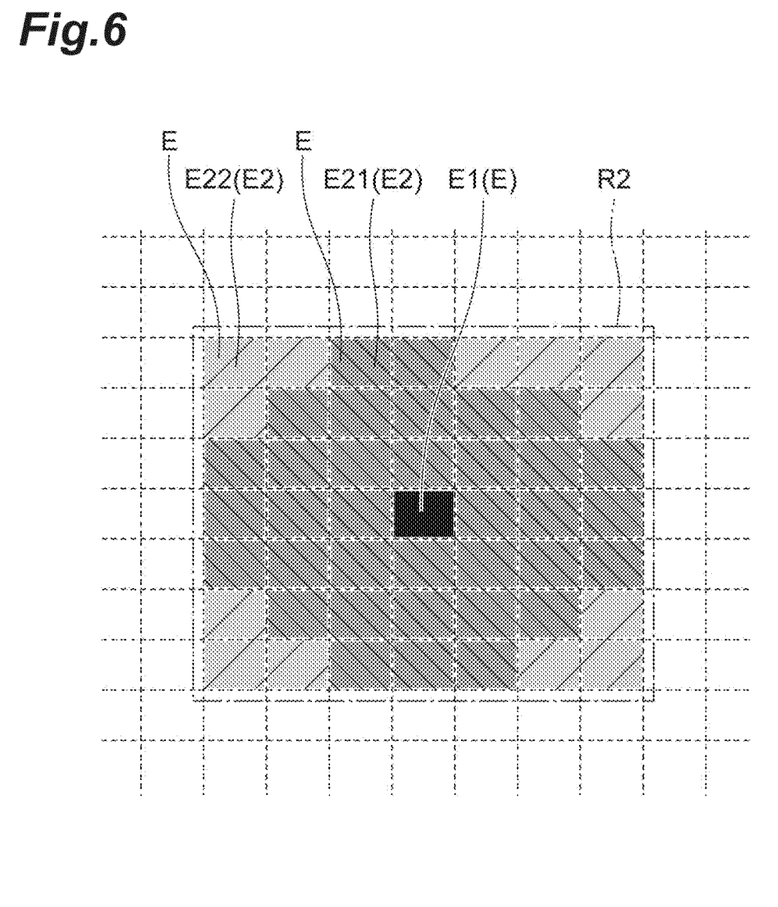
FIG. 6 is a diagram illustrating an example of a first pixel of distance image data and a second pixel located around the first pixel.

In an example illustrated in FIG. 6, the pixel E in which the distance between the object 4 and the depth sensor 20 is short is shown in a dark color, and the pixel E in which the distance between the object 4 and the depth sensor 20 is long is shown in a light color. When the object detection unit 41 determines that the pixel E is a first pixel E1 corresponding to the distance smaller than the temporary reference value T1, the object detection unit 41 sets a surrounding region R2 having the first pixel E1 as its center, and scans a plurality of second pixels E2 in the surrounding region R2. The surrounding region R2 is, for example, a region having a size (range) corresponding to the size of the object 4. In the present embodiment, the surrounding region R2 is, for example, a rectangular region including 7×7 pixels having the first pixel E1 as its center. The second pixels E2 are, for example, all the pixels E excluding the first pixel E1 in the surrounding region R2. In the example illustrated in FIG. 6, the second pixels E2 are 48 pixels E located around the first pixel E1.

The object detection unit 41 determines whether or not the number of second pixels E21 for which the difference between the distance corresponding to each second pixel E2 and the distance corresponding to the first pixel E1 is equal to or less than a predetermined value (for example, 10 mm), among the plurality of second pixels E2 in the surrounding region R2, is equal to or greater than a predetermined number. The "predetermined number" is, for example, half of the total number of second pixels E2 or 70% of the total number of second pixels E2, but can be appropriately changed.

In the present embodiment, the object detection unit 41 determines whether or not the number of second pixels E21 for which the difference between the distance corresponding to each second pixel E2 and the distance corresponding to the first pixel E1 is equal to or less than 10 mm, among the total of 48 second pixels E2, is equal to or greater than 35. In the example illustrated in FIG. 6, the second pixel E21 is shown in a lighter color than the first pixel E1, and the second pixel E22 for which the difference from the above-described distance is not equal to or less than 10 mm is shown in a lighter color than the second pixel E21.

When it is determined that the number of second pixels E21 is equal to or greater than 35, the object detection unit 41 updates the temporary reference value T1 with the distance corresponding to the first pixel E1, and records the two-dimensional position of the object 4. On the other hand, when it is determined that the number of second pixels E21 is not equal to or greater than 35, the object detection unit 41 determines that the first pixel E1 is noise and does not update the temporary reference value T1.

After scanning all the pixels E in the scanning region R1, the object detection unit 41 sets the first pixel E1 corresponding to the shortest distance, which is recorded as the temporary reference value T1, as a pixel indicating that the distance between the depth sensor 20 and the object 4 is short. The object detection unit 41 detects the object 4 by specifying the first pixel E1 as a pixel indicating that the distance between the depth sensor 20 and the object 4 is short. When the object 4 is detected, the object detection unit 41 outputs position data indicating the position of the object 4 to the operation determination unit 42.

FIG. 4 is referred to again. The operation determination unit 42 determines, based on the position data output from the object detection unit 41, whether or not the operation of pressing the operation unit 2 has been performed by the object 4. As illustrated in FIG. 1, the operation determination unit 42 determines whether the distance D1 between the depth sensor 20 and the object 4, that is, the shortest distance corresponding to the first pixel E1 specified by the object detection unit 41 is equal to or less than a predetermined threshold value T2. The threshold value T2 is, for example, 100 mm, but can be appropriately changed. Then, when it is determined that the distance D1 is equal to or less than the threshold value T2, the operation determination unit 42 determines that the object 4 has reached a virtual pressing determination surface S and the pressing operation on the operation unit 2 has been performed.

The pressing determination surface S is a virtual surface formed in a part where the distance from a depth sensor 20 is constant, and is provided at a position near the operation unit 2. The position of the pressing determination surface S may match the position of the operation unit 2, or may be a position separated from the operation unit 2 by a predetermined distance. In the present embodiment, the position of the pressing determination surface S matches the position of the operation unit 2.

When the operation determination unit 42 determines that the pressing operation on the operation unit 2 has been performed, the signal output unit 43 generates a control signal based on the pressing operation on the operation unit 2. The signal output unit 43 outputs the generated control signal to a device, such as the vehicle-mounted back camera described above, and the device operates by receiving the control signal from the signal output unit 43. In the example illustrated in FIG. 3, when the operation determination unit 42 determines that the pressing operation on the first virtual image button 2A, the second virtual image button 2B, or the third virtual image button 2C has been performed, the signal output unit 43 outputs a control signal to the vehicle-mounted back camera. The vehicle-mounted back camera displays one of an image of the left side of the vehicle, an image of the rear side of the vehicle, and an image of the right side of the vehicle based on the input control signal.

Figure 7:
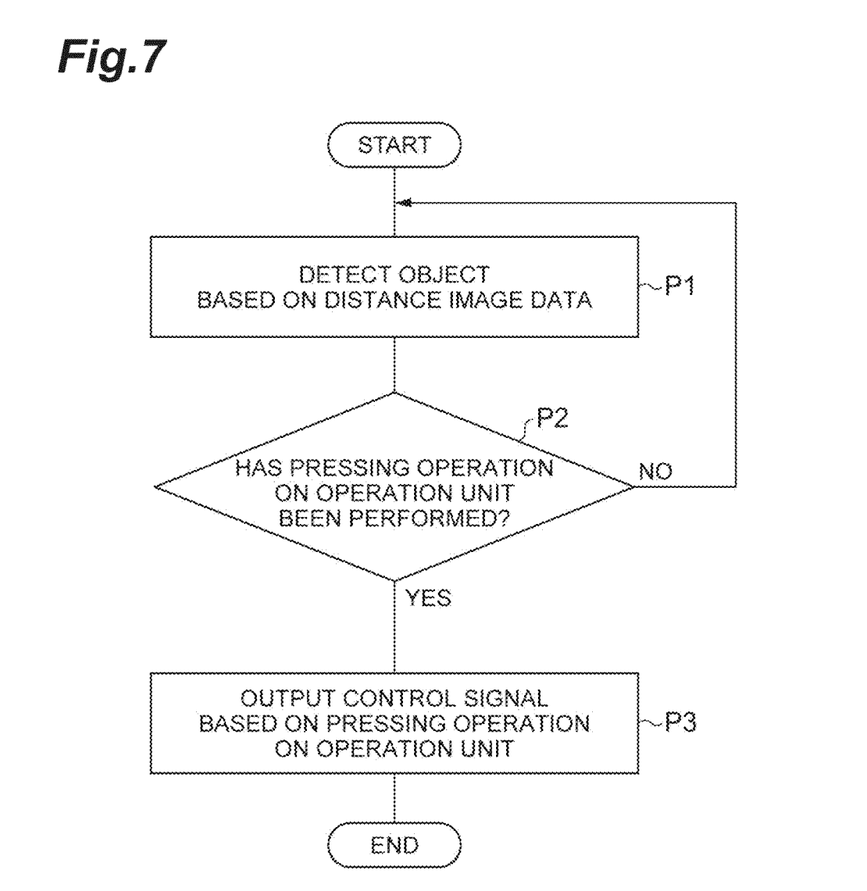
FIG. 7 is a flowchart illustrating an example of the operation of the operation detection device illustrated in FIG. 1.

Next, the operation of the operation detection device 1 will be described. The operation of the operation detection device 1 is performed by the CPU 31 that reads and executes the program stored in the storage unit 32, for example. FIG. 7 is a flowchart illustrating an example of the operation of the operation detection device 1. First, the depth sensor 20 acquires the distance image data D including information of the two-dimensional position of the object 4 and information of the distance D1 from the depth sensor 20 to the object 4, and outputs the acquired distance image data D to the control unit 30. The object detection unit 41 detects the object 4 based on the input distance image data D (step P1). Details of the step P1 will be described later. When the object 4 is detected, the object detection unit 41 outputs position data indicating the position of the object 4 to the operation determination unit 42.

Then, the operation determination unit 42 determines whether or not the pressing operation on the operation unit 2 has been performed based on the position data output from the object detection unit 41 (step P2). Specifically, the operation determination unit 42 determines whether or not the distance D1 between the depth sensor 20 and the object 4 is equal to or less than the threshold value T2, as illustrated in FIG. 1. When it is determined that the distance D1 is equal to or less than the threshold value T2 (YES in step P2), the operation determination unit 42 determines that the object 4 has reached the virtual pressing determination surface S and the pressing operation on the operation unit 2 has been performed. On the other hand, when it is determined that the distance D1 is not equal to or less than the threshold value T2 (NO in step P2), the operation determination unit 42 determines that the object 4 has not reached the pressing determination surface S and the pressing operation on the operation unit 2 has not been performed. When it is determined that the pressing operation on the operation unit 2 has not been performed, the process returns to the step P1 to continuously execute the step P1 of detecting the object 4.

When the operation determination unit 42 determines that the pressing operation on the operation unit 2 has been performed (YES in step P2), the signal output unit 43 generates a control signal based on the pressing operation on the operation unit 2. The signal output unit 43 outputs the generated control signal to a device, such as the vehicle-mounted back camera described above, and the device operates by receiving the control signal from the signal output unit 43 (step P3). Then, a series of steps are completed.

Figure 8:
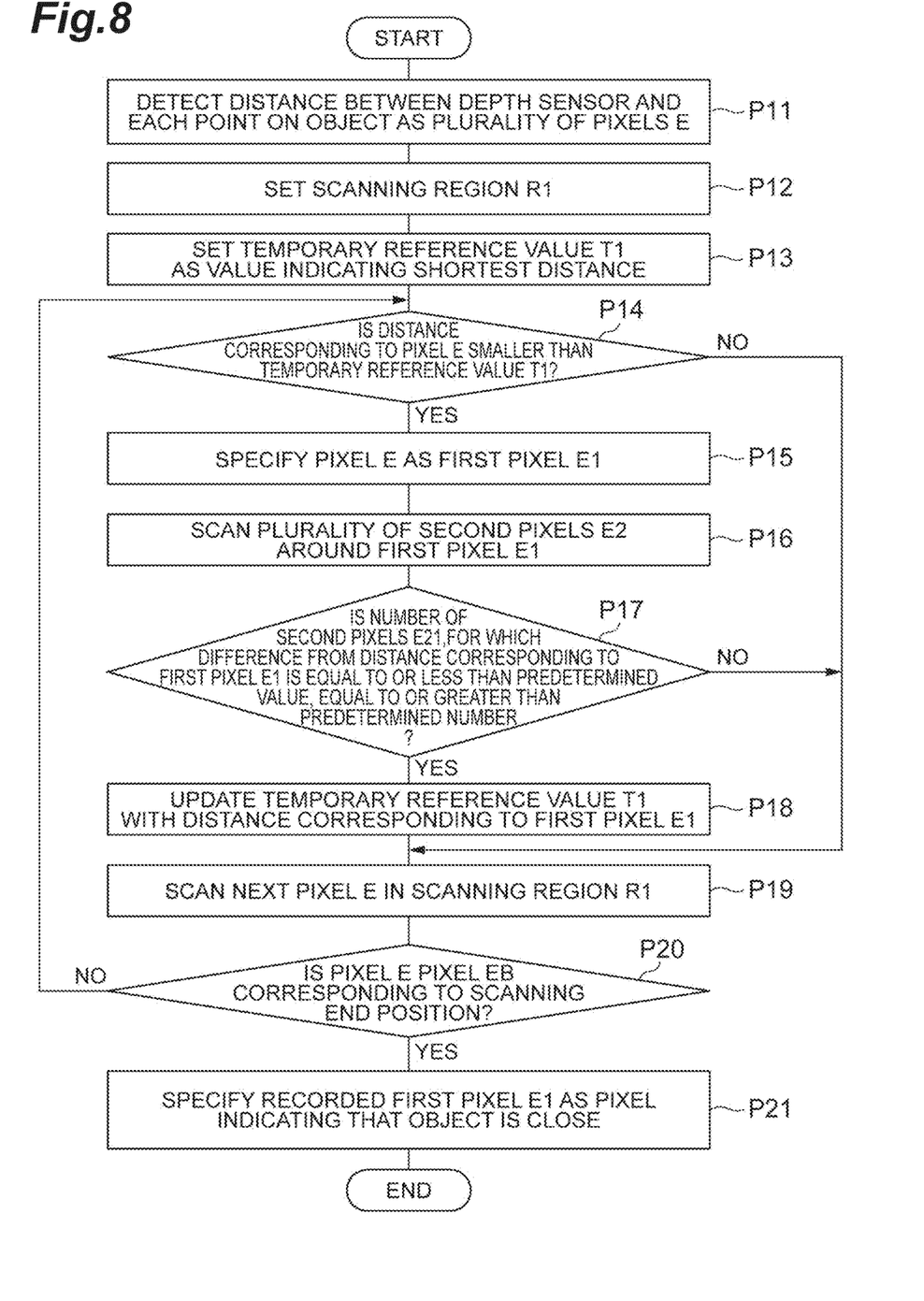
FIG. 8 is a flowchart illustrating some of the steps of the flowchart illustrated in FIG. 7 in detail.

Here, the step P1 in which the object detection unit 41 detects the object 4 will be described in detail. In addition, the operation detection method of the present embodiment will be described. FIG. 8 is a flowchart illustrating the step P1 of the flowchart illustrated in FIG. 7 in detail. First, the depth sensor 20 detects, as a plurality of pixels E, the distance image data D including the information of the two-dimensional position of each point on the object and the information of the distance from the depth sensor 20 to each point on the object, and outputs the plurality of detected pixels E to the control unit 30 (step P11).

Then, the object detection unit 41 sets the scanning region R1 for the distance image data D input from the depth sensor 20 (step P12). For example, the object detection unit 41 sets the position of the pixel EA at one corner on the diagonal of the rectangular scanning region R1 as the scanning start position. Thereafter, the object detection unit 41 sets the temporary reference value T1 as a value indicating the shortest distance between the depth sensor 20 and each point on the object 4 (step P13).

Then, the object detection unit 41 sequentially scans the respective pixels E in the scanning region R1 from the pixel EA, and determines whether or not the distance corresponding to the pixel E is smaller than the temporary reference value T1 (step P14). When it is determined that the distance is smaller than the temporary reference value T1 (YES in step P14), the object detection unit 41 specifies the pixel E corresponding to the distance as the first pixel E1 (step P15). On the other hand, when it is determined that the distance corresponding to the pixel E is not smaller than the temporary reference value T1 (NO in step P14), the object detection unit 41 does not specify the pixel E corresponding to the distance as the first pixel E1 and scans the next pixel E in the scanning region R1 (step P19).

After determining that the distance corresponding to the pixel E is smaller than the temporary reference value T1 and specifying the first pixel E1, the object detection unit 41 sets the surrounding region R2 with the specified first pixel E1 as the center and scans a plurality of second pixels E2 in the surrounding region R2 (step P16). Thereafter, the object detection unit 41 determines whether or not the number of second pixels E21 for which the difference between the distance corresponding to each second pixel E2 and the distance corresponding to the first pixel E1 is equal to or less than a predetermined value, among the plurality of second pixels E2 in the surrounding region R2, is equal to or greater than a predetermined number (step P17). In the present embodiment, the object detection unit 41 determines whether or not the number of second pixels E21, for which the difference between the distance corresponding to each second pixel E2 and the distance corresponding to the first pixel E1 is equal to or less than 10 mm, is equal to or greater than 35.

When it is determined that the number of second pixels E21 is 35 or more (YES in step P17), the object detection unit 41 updates the temporary reference value T1 with the distance corresponding to the first pixel E1 (step P18). At this time, the object detection unit 41 records the two-dimensional position of the object 4. Then, the object detection unit 41 scans the next pixel E in the scanning region R1 (step P19). On the other hand, when it is determined that the number of second pixels E21 is not equal to or greater than 35 (NO in step P17), the object detection unit 41 determines that the first pixel E1 is noise and does not update the temporary reference value T1. Then, step P19 is executed.

After scanning the next pixel E in the scanning region R1, the object detection unit 41 determines whether or not the pixel E is the pixel EB corresponding to the scanning end position (step P20). When it is determined that the pixel E is the pixel EB (YES in step P20), the object detection unit 41 detects the object 4 by specifying the first pixel E1 corresponding to the shortest distance, which is recorded as the temporary reference value T1, as a pixel indicating that the distance between the depth sensor 20 and the object 4 is short (step P21). When the object 4 is detected, the object detection unit 41 outputs position data including the information of the position of the object 4 to the operation determination unit 42, and then step P2 is executed. On the other hand, when the object detection unit 41 determines that the pixel E is not the pixel EB (NO in step P20), the process returns to step P14.

Next, effects obtained by the operation detection device 1 and the operation detection method of the present embodiment will be described. In the present embodiment, as illustrated in FIG. 6, the depth sensor 20 detects the distance from the object 4 as a plurality of pixels E, and the object detection unit 41 specifies the first pixel E1 corresponding to the shortest distance whose distance from the object 4 is the shortest. Then, the object detection unit 41 scans the plurality of second pixels E2 located around the specified first pixel E1, and detects the object 4 when the number of second pixels E21 corresponding to a distance whose difference from the shortest distance is equal to or less than a predetermined value, among the plurality of scanned second pixels E2, is equal to or greater than a predetermined number. On the other hand, when the number of second pixels E21 corresponding to the distance whose difference from the shortest distance is equal to or less than the predetermined value, among the plurality of scanned second pixels E2, is less than the predetermined number, the object detection unit 41 does not detect the object 4. In this manner, by not detecting the object 4 when the number of second pixels E21 is less than the predetermined number, it can be determined that the specified first pixel E1 is noise. As a result, since the influence of noise can be eliminated and erroneous detection of the object 4 can be suppressed, the object 4 can be detected with high accuracy. In addition, in the operation detection device 1 and the operation detection method, since the process of acquiring the shape of the object 4 when detecting the object 4 is unnecessary, it is possible to reduce the processing load to increase the processing speed. Therefore, the object 4 can be detected at high speed.

The object detection unit 41 detects the object 4 when the number of second pixels E21 corresponding to the distance whose difference from the shortest distance is equal to or less than a predetermined value, among the plurality of second pixels E2 in the surrounding region R2, is equal to or greater than half or 70% of the total number of second pixels E2. Therefore, since it is possible to more reliably suppress erroneous detection of the object 4 due to noise, it is possible to detect the object 4 with higher accuracy. In addition, the surrounding region R2 set by the object detection unit 41 has a size corresponding to the size of the object 4. Therefore, for example, erroneous detection of a non-object smaller than the object 4 can be suppressed, so that the object 4 can be detected with higher accuracy.

The operation detection device 1 includes the operation determination unit 42. Therefore, it is possible to determine whether or not a pressing operation on the operation unit 2 has been performed.

The operation unit 2 is displayed as the virtual image 3. When the operation unit 2 is displayed as the virtual image 3, the operation unit 2 can be displayed as if the operation unit 2 floats, so that the visibility of the operation unit 2 can be improved. When the operation unit 2 is displayed as the virtual image 3, there may be a change in the position of the operation unit 2 recognized by the user U. Accordingly, it is assumed that the pressing operation on the operation unit 2 is not appropriately performed. Even in such a case, in the operation detection device 1 and the operation detection method of the present embodiment, it is possible to suppress erroneous detection of the object 4. Therefore, according to the operation detection device 1 and the operation detection method of the present embodiment, the object 4 can be detected with high accuracy.

The embodiments of the operation detection device and the operation detection method according to the present disclosure have been described above. However, the present disclosure is not limited to the above-described embodiments, and may be modified or applied to other things without departing from the scope described in the claims. That is, the content and order of each step of the operation detection method and the configuration of each unit of the operation detection device can be appropriately changed without departing from the scope of the claims.

For example, in the above-described embodiments, the depth sensor 20 measures the distance between the depth sensor 20 and each point on the object using the Light Coding method, but the measurement is not limited to this method. For example, the depth sensor 20 may measure the distance between the depth sensor 20 and each point on the object using a TOF (Time of Flight) method. In the TOF method, the depth sensor 20 calculates the flight time (that is, delay time) of a light beam until the light beam is reflected at each point on the object and reaches the depth sensor 20, and the distance between the depth sensor 20 and each point on the object is measured from the calculated flight time and the speed of light. Even in such a form, the same effect as that of the above-described embodiments can be obtained.

In the above-described embodiments, the object detection unit 41 determines whether or not the number of second pixels E21 among the total of 48 second pixels E2 is equal to or greater than 35. However, the total number of second pixels E2 is not limited to 48 and can be appropriately changed. The number of second pixels E21 as a determination criterion is not limited to 35 and can be appropriately changed. The shape and display mode of each pixel E are not particularly limited and can be appropriately changed. In the above-described embodiments, the scanning region R1 and the surrounding region R2 each having a rectangular shape have been described. However, the shapes and display modes of these regions are not particularly limited.

In the above-described embodiments, an example has been described in which the operation unit 2 includes the first virtual image button 2A, the second virtual image button 2B, and the third virtual image button 2C. However, the layout and type of the operation unit can be appropriately changed. The operation detection device may be a device that detects an operation for operating each device other than the vehicle, and the operation detection device and the operation detection method can be applied to various devices other than the vehicle.

REFERENCE SIGNS LIST

1: operation detection device, 2: operation unit, 3: virtual image, 4: object, 10: display unit, 20: depth sensor, 30: control unit, 41: object detection unit, 42: operation determination unit, E: pixel, E1: first pixel, E2, E21, E22: second pixel.

The invention claimed is:

1. An operation detection device for detecting an object approaching an operator, comprising:
   a sensor that detects a distance from the object to the sensor as a plurality of pixels; and
   a detector that detects the object, wherein the detector is configured to perform the following processes:
      acquiring distance image data including the plurality of pixels,
         wherein each pixel includes positional information of each point of the object and distance information of the each point from the sensor,
         wherein the plurality of pixels include one first pixel and N second pixels, N being a positive integer,
         wherein distance information of the first pixel corresponds to a shortest distance from the sensor out of distance information of the plurality of pixels, and
         wherein the N second pixels are pixels surrounding the first pixel in the distance image data;
      specifying the first pixel; and
      detecting the object, wherein the detecting comprises:
         scanning one of the N second pixels;
         identifying a difference between the shortest distance of the first pixel and a distance of the scanned second pixel;
         identifying a number of the second pixels in case that the identified difference is less than a reference value; and
         identifying the first pixel as a pixel indicating a distance between the sensor and the object and detecting the object, when the identified number of the second pixels is greater than a reference number.

2. The operation detection device according to claim 1, further comprising:
   a determinator that determines whether or not an operation on the operator by the object detected by the detector has been performed.

3. The operation detection device according to claim 2, wherein, when the distance from the object to the sensor is less than a threshold value, the determinator determines that the object has reached a virtual pressing determination surface and a pressing operation by a user on the operator has been performed.

4. The operation detection device according to claim 3, wherein, the virtual pressing determination surface is a virtual surface and the position of the virtual pressing determination surface is the same as the position of the operator.

5. The operation detection device according to claim 3, wherein, the virtual pressing determination surface is a virtual surface and the position of the virtual pressing determination surface is spaced from the position of the operator.

6. The operation detection device according to claim 1, wherein the operator is displayed as a virtual image.

7. The operation detection device according to claim 6, wherein the operator is a switch displayed in air as the virtual image between a user and the operation detection device.

8. An operation detection method for detecting an object approaching an operator using a sensor that detects a distance from the object to the sensor as a plurality of pixels, the method comprising:
   acquiring distance image data including the plurality of pixels,
      wherein each pixel includes positional information of each point of the object and distance information of the each point from the sensor,
      wherein the plurality of pixels include one first pixel and N second pixels, N being a positive integer,
      wherein distance information of the first pixel corresponds to a shortest distance from the sensor out of distance information of the plurality of pixels, and
      wherein the N second pixels are pixels surrounding the first pixel in the distance image data;
   specifying the first pixel; and
   detecting the object, wherein the detecting comprises:
      scanning one of the N second pixels;
      identifying a difference between the shortest distance of the first pixel and a distance of the scanned second pixel;
      identifying a number of the second pixels in case that the identified difference is less than a reference value; and
      identifying the first pixel as a pixel indicating a distance between the sensor and the object and detecting the object, when the identified number of the second pixels is greater than a reference number.

9. The operation detection method according to claim 8, wherein, during the detecting, when the identified number of the second pixels is not greater than the reference number, the first pixel is not identified as the pixel indicating the distance between the sensor and the object and the object is not detected.

10. The operation detection method according to claim 8, wherein the specifying the first pixel comprises:
- setting a temporary reference value as a value temporarily indicating the shortest distance out of the distances of the plurality of pixels;
- determining whether or not a distance of one pixel of the plurality of pixels is less than the temporary reference value; and
- when the distance of the determined pixel of the plurality of pixels is less than the temporary reference value, specifying the pixel as the first pixel.

11. The operation detection method according to claim 10, wherein the detecting further comprises:
- updating the temporary reference value with the distance of the specified pixel as the first pixel, when the identified number of the second pixels is greater than the reference number.

12. The operation detection method according to claim 8, wherein the number N of the second pixels corresponds to size of the object.

13. The operation detection method according to claim 8, wherein the reference value is 10 mm.

14. The operation detection method according to claim 8, wherein the reference number is 50% of the number N of the second pixels.

15. The operation detection method according to claim 8, wherein the reference number is 70% of the number N of the second pixels.

16. An operation detection device for a vehicle for detecting an object approaching an operator, comprising:
- a sensor that detects a distance from the object to the sensor as a plurality of pixels;
- a detector that detects the object;
- a determinator that determines whether or not an operation on the operator by the object detected by the detector has been performed; and
- a signal generator generates a control signal when the determinator determines that the operation has been performed and outputs the generated control signal to a device in the vehicle, wherein the device is operated by receiving the control signal from the signal generator,
- wherein the detector is configured to perform the following processes:
  - acquiring distance image data including the plurality of pixels,
    - wherein each pixel includes positional information of each point of the object and distance information of the each point from the sensor,
    - wherein the plurality of pixels include one first pixel and N second pixels, N being a positive integer,
    - wherein distance information of the first pixel corresponds to a shortest distance from the sensor out of distance information of the plurality of pixels, and
    - wherein the N second pixels are pixels surrounding the first pixel in the distance image data;
  - specifying the first pixel; and
  - detecting the object, wherein the detecting comprises:
    - scanning one of the N second pixels;
    - identifying a difference between the shortest distance of the first pixel and a distance of the scanned second pixel;
    - identifying a number of the second pixels in case that the identified difference is less than a reference value; and
    - identifying the first pixel as a pixel indicating a distance between the sensor and the object and detecting the object, when the identified number of the second pixels is greater than a reference number.

17. The operation detection device for the vehicle according to claim 16, wherein the device is a back camera mounted to the vehicle.

18. The operation detection device for the vehicle according to claim 16, wherein the device is an air conditioner mounted to the vehicle.

19. The operation detection device for the vehicle according to claim 16, wherein the object is a finger of a driver of the vehicle.

* * * * *